US008013879B2

(12) United States Patent
Iwahara et al.

(10) Patent No.: US 8,013,879 B2
(45) Date of Patent: Sep. 6, 2011

(54) IMAGE DISPLAY APPARATUS AND IMAGE DISPLAY METHOD

(75) Inventors: Hiroaki Iwahara, Kumagaya (JP); Go Tomita, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/575,341

(22) Filed: Oct. 7, 2009

(65) Prior Publication Data

US 2010/0194786 A1 Aug. 5, 2010

(30) Foreign Application Priority Data

Jan. 30, 2009 (JP) ................................ 2009-019681

(51) Int. Cl.
*G09G 5/10* (2006.01)
*G06G 5/00* (2006.01)
*G06F 3/038* (2006.01)
*G05F 1/00* (2006.01)

(52) U.S. Cl. ......................... 345/690; 345/204; 315/291

(58) Field of Classification Search .......... 345/204–215, 345/690–699

See application file for complete search history.

(56) References Cited

U.S. PATENT DOCUMENTS

| | | | | |
|---|---|---|---|---|
| 6,294,883 | B1 * | 9/2001 | Weindorf | 315/291 |
| 2003/0169247 | A1 * | 9/2003 | Kawabe et al. | 345/204 |

FOREIGN PATENT DOCUMENTS

| | | | |
|---|---|---|---|
| JP | 06-332387 | A | 12/1994 |
| JP | 06-337640 | A | 12/1994 |
| JP | H06-332387 | A | 12/1994 |
| JP | H06-337640 | A | 12/1994 |
| JP | 07-013128 | A | 1/1995 |
| JP | H07-013128 | A | 1/1995 |
| JP | 09-197374 | | 7/1997 |
| JP | 09-197374 | A | 7/1997 |
| JP | 10-148808 | A | 6/1998 |
| JP | H10-148808 | A | 6/1998 |
| JP | 10-268267 | | 10/1998 |
| JP | 10-268267 | A | 10/1998 |
| JP | 2006-171693 | A | 6/2006 |
| JP | 2007-108285 | A | 4/2007 |
| JP | 2007-156157 | | 6/2007 |
| JP | 2007-156157 | A | 6/2007 |

OTHER PUBLICATIONS

Notification of Reasons for Refusal mailed by Japan Patent Office on Dec. 15, 2009 in the corresponding Japanese patent application No. 2009-019681.

Decision of Patent Grant mailed by Japan Patent Office on Mar. 16, 2010 in the corresponding Japanese patent application No. 2009-019681.

* cited by examiner

*Primary Examiner* — Alexander S Beck
*Assistant Examiner* — Charles Hicks
(74) *Attorney, Agent, or Firm* — Knobbe Martens Olson & Bear, LLP

(57) ABSTRACT

An image display apparatus including: a display panel configured to display a display image based on an image signal; an illumination unit configured to output an illumination light for illuminating the display panel; and a controller configured to correct, when a illumination request for illuminating the display panel is received, at least one of brightness and chromaticity of the illumination light based on light-on time and light-off time of the illumination unit previous to a time point at which the illumination request is received.

9 Claims, 7 Drawing Sheets

FIG. 3

LIGHT-ON TIME-FACTOR TABLE

| LIGHT-ON TIME A | FACTOR |
|---|---|
| A ≤ 5 MINUTES | 1 |
| 5 MINUTES < A ≤ 10 MINUTES | 2 |
| 10 MINUTES < A ≤ 15 MINUTES | 3 |
| 15 MINUTES < A ≤ 20 MINUTES | 4 |
| 20 MINUTES < A ≤ 25 MINUTES | 5 |
| 25 MINUTES < A ≤ 30 MINUTES | 6 |
| 30 MINUTES < A | 7 |

FIG. 4

LIGHT-OFF TIME-FACTOR TABLE

| LIGHT-OFF TIME B | FACTOR |
|---|---|
| B ≤ 5 MINUTES | 1 |
| 5 MINUTES < B ≤ 10 MINUTES | 2 |
| 10 MINUTES < B ≤ 15 MINUTES | 3 |
| 15 MINUTES < B ≤ 20 MINUTES | 4 |
| 20 MINUTES < B ≤ 25 MINUTES | 5 |
| 25 MINUTES < B ≤ 30 MINUTES | 6 |
| 30 MINUTES < B | 7 |

IMAGE DISPLAY APPARATUS AND IMAGE DISPLAY METHOD

CROSS REFERENCE TO RELATED APPLICATION(S)

The present disclosure relates to the subject matters contained in Japanese Patent Application No. 2009-019681 filed on Jan. 30, 2009, which are incorporated herein by reference in its entirety.

FIELD

The present invention relates to an image display apparatus and an image display method for displaying an image using a display device, such as a liquid crystal display panel.

BACKGROUND

As is well known in the art, in recent years, television broadcasting receivers employing a liquid crystal display panel for display of an image have rapidly come into wide use. A liquid crystal display panel tends to be particularly used for large screen-oriented television broadcasting receivers because it is thinner and lighter than a CRT (cathode ray tube) display.

Such a liquid crystal display panel displays an image by transmitting illumination light from a backlight represented by a cold cathode tube such as, for example, a fluorescent tube or a discharge lamp. Accordingly, if the brightness or the chromaticity of the illumination light generated by the backlight is changed, the color taste, such as hue (color itself), tint, contrast, etc. of the image to be displayed is varied, thereby causing variation of image quality.

However, it is known that a cold cathode tube which has been widely employed as the backlight at present is varied in brightness or chromaticity of the illumination light until a certain period of time is elapsed after the tube is lighted-on. In addition, the time required, until the brightness or the chromaticity of the illumination light becomes stable after the tube is lighted-on, varies depending on the maintenance temperature or the ambient temperature of the cold cathode tube when the cold cathode tube is lighted-on.

A document, JP-A-2007-108285, discloses a liquid crystal display apparatus which is capable of correcting a misalignment of chromaticity of a display image with time lapse from the power-up by varying component ratios of the color signals in a matrix circuit which multiplies factors with components of the color signals of the image signal and adds results of the multiplication based on counter values of a counter which counts a period of time from the power-up.

However, in the liquid crystal display apparatus disclosed in JP-2007-108285, since the chromaticity misalignment is uniformly corrected with the lapse of time from the power-up, if the apparatus is powered-up under conditions of sufficiently high maintenance temperature, such as, for example, if the apparatus is powered-up for a long time and then is again powered-on after a very short power-off period of time, the chromaticity correction may be excessive.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 3 is a view for explaining a light-on time-factor table of an estimated value calculating module of the digital television broadcasting receiver according to this embodiment.

FIG. 4 is a view for explaining a light-off time-factor table of an estimated value calculating module of the digital television broadcasting receiver according to this embodiment.

DETAILED DESCRIPTION OF THE EMBODIMENTS

Figure 1:
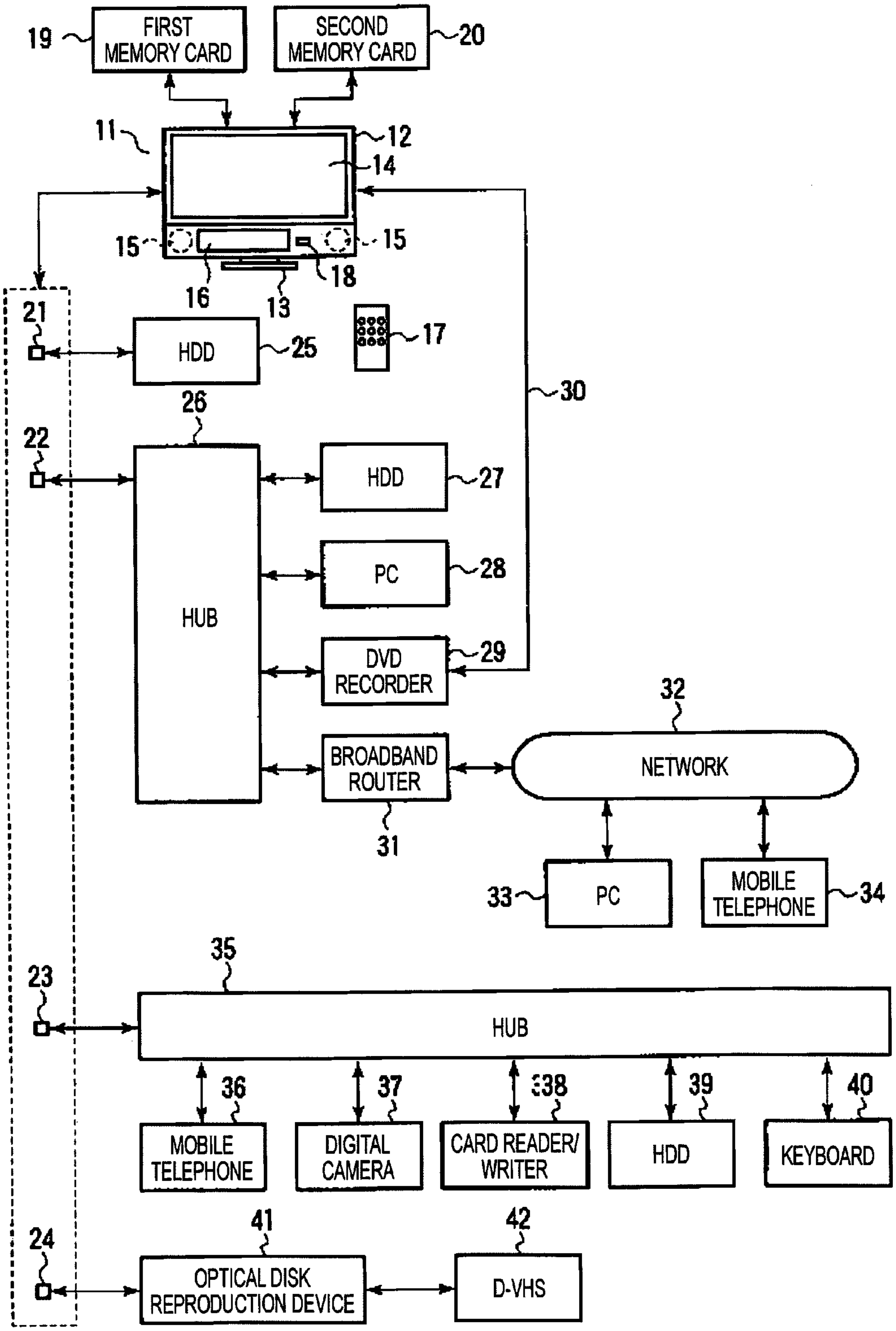
FIG. 1 is a view for explaining a digital television broadcasting receiver and an example of a network system digital television broadcasting receiver as the central figure according to an embodiment of the present invention.

Hereinafter, embodiments of the present invention will be described in detail with reference to the drawings. FIG. 1 schematically shows an appearance of a digital television broadcasting receiver 11 and an example of a network system configured with the digital television broadcasting receiver 11 as the central figure according to an embodiment of the present invention.

The digital television broadcasting receiver 11 includes, as main components, a thin cabinet 12 and a support leg 13 for standing up and supporting the cabinet 12. In the cabinet 12 are provided with an image display device 14 as a flat panel type display including, for example, a liquid crystal display panel or the like, a pair of speakers 15, a user interface 16, a light receiver 18 which receives operation information transmitted from a remote controller 17, etc.

A first memory card 19 such as, for example, a SD (secure digital) memory card, a MMC (multimedia card), a memory stick or the like is detachably attached to the digital television broadcasting receiver 11, and a record/reproduction operation of information such as programs, photographs and so on is performed for the first memory card 19.

A second memory card [IC (integrated circuit card)] 20 recorded with, for example, contract information and the like is detachably attached to the digital television broadcasting receiver 11, and a reproduction operation of the contract information is performed for the second memory card 20.

The digital television broadcasting receiver 11 includes a first LAN (local area network) terminal 21, a second LAN terminal 22, a USB (universal serial bus) terminal and an IEEE (Institute of Electrical and Electronics Engineers) 1394 terminal 24.

Among these terminals, the first LAN terminal 21 is used as a LAN correspondence HDD (Hard Disk Drive) dedicated port for performing an information record/reproduction operation for a LAN correspondence HDD 25, which is a connected NAS (network attached storage), by means of Ethernet (registered trademark).

In this manner, by providing the first LAN terminal 21 as the LAN correspondence HDD dedicated port, an information record operation of a program by high-vision image quality can be stably performed for the HDD 25 without being affected by different network environments, network use situations and the like.

The second LAN terminal 22 is used as a general LAN correspondence port which uses Ethernet (registered trademark) and is connected with devices such as a LAN correspondence HDD 27, a PC (personal computer) 28, a HDD-contained DVD (digital versatile disk) recorder 29 having a digital broadcasting reception function, and the like via, for example, a hub 26 for information exchange with these devices.

For the DVD recorder 29, since digital information communicated via the second LAN terminal 22 is information for only a control system, there is a need to provide a dedicated analog transmission path 30 in order to exchange analog image and audio information with the digital television broadcasting receiver 11.

The second LAN terminal 22 can be connected to a network 32 such as, for example, Internet via a broadband router 31 connected to the hub 26 and is used to exchange information with a PC 33, a mobile telephone 34 or the like at a remote place via the network 32.

The USB terminal 23 is used as a general USB correspondence port and is connected with USB devices such as a mobile telephone 36, a digital camera 37, a card reader/writer 38 for a memory card, a HDD 39, keyboard 40 and the like via, for example, a hub 35 for information exchange with these USB devices.

The IEEE 1394 terminal 24 is connected in series to, for example, an AV (Audio/Video)-HDD 41, a D (Digital)-VHS (Video Home System) 42 and the like each having a digital broadcasting reception function according to the IEEE 1394 standards for information exchange with these devices.

Figure 2:
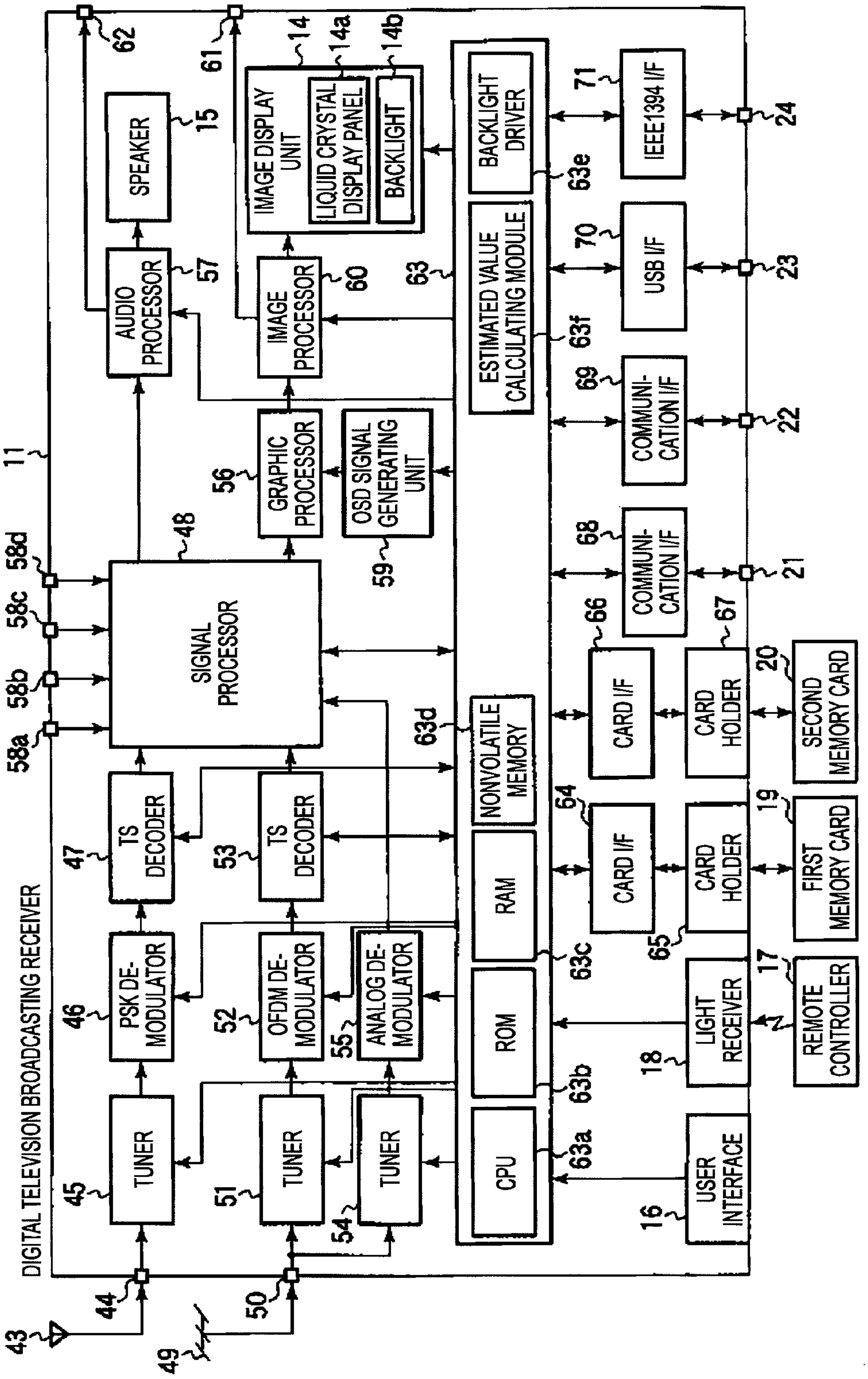
FIG. 2 is a block diagram for explaining a main signal processing system of the digital television broadcasting receiver according to this embodiment.

FIG. 2 shows a main signal processing system of the digital television broadcasting receiver 11. Referring to this figure, satellite digital broadcasting signals received by an antenna 43 for BS/CS digital broadcasting reception are supplied, via an input terminal 44, to a satellite digital broadcasting tuner 45 to select a broadcasting signal of a desired channel.

The broadcasting signal selected by the tuner 45 is supplied to a PSK (Phase Shift Keying) demodulator 46 in which a TS (Transport Stream) is demodulated. The demodulated TS is supplied to a TS decoder 47 in which the demodulated TS is decoded into a digital image signal, a digital audio signal, etc. which are then output to a signal processor 48.

addition, terrestrial digital television broadcasting signal received by an antenna 49 for terrestrial wave broadcasting reception are supplied, via an input terminal 50, to a terrestrial digital broadcasting tuner 51 to select a broadcasting signal of a desired channel.

The broadcasting signal selected by the tuner 51 is supplied to an OFDM (Orthogonal Frequency Division Multiplexing) demodulator 52 in which a TS is demodulated. The demodulated TS is supplied to a TS decoder 53 in which the demodulated TS is decoded into a digital image signal and a digital audio signal which are then output to the signal processor 48.

The terrestrial analog television broadcasting signals received by the antenna 49 for terrestrial wave broadcasting reception are supplied, via the input terminal 50, to a terrestrial analog broadcasting tuner 54 to select a broadcasting signal of a desired channel. The broadcasting signal selected by the tuner 54 is supplied to an analog demodulator 55 in which the supplied broadcasting signal is demodulated into an analog image signal and an analog audio signal which are then output to the signal processor 48.

Here, the signal processor 48 selectively performs a predetermined digital signal process for the digital image and audio signals supplied from the TS decoders 47 and 53 and outputs the processed digital image and audio reproduction signals to a graphic processor 56 and a audio processor 57, respectively.

In addition, a plurality (4 in this figure) of input terminals 58*a*, 58*b*, 58*c* and 58*d* is connected to the signal processor 48. These input terminals 58*a* to 58*d* allow analog image and audio reproduction signals to be input from the external of the digital television broadcasting receiver 11.

In addition, the signal processor 48 selectively digitizes the analog image and audio reproduction signals supplied from the analog demodulator 55 and the input terminals 58*a* to 58*d*, respectively, performs a predetermined digital signal process for the digitalized image and audio reproduction signals, and then outputs the processed image and audio reproduction signals to the graphic processor 56 and the audio processor 57, respectively.

The graphic processor 56 has a function to superimpose an OSD (On Screen Display) signal generated in an OSD signal generating unit 59 on a digital image signal supplied from the signal processor 48. In addition, the graphic processor 56 can selectively output the output image signal of the signal processor 48, the OSD signal of the OSD signal generating unit 59, or a combination thereof to construct a half of a picture, respectively.

A digital image signal output from the graphic processor 56 is supplied to an image processor 60. The image processor 60 converts the input digital image signal into an analog image signal of a format which can be displayed on the image display device 14, and outputs the analog image signal to the external via an output terminal 61 while outputting the same signal to the image display device 14 for image display.

The audio processor 57 converts the input digital audio signal into an analog audio signal of a format which can be reproduced by the speaker 15, and outputs the analog audio signal to the external via an output terminal 62 while outputting the same signal to the speaker 15 for audio reproduction.

Here, a controller 63 generally controls all operations of the digital television broadcasting receiver 11, including the above-mentioned various reception operations. The controller 63 contains a CPU (Central Processing Unit) 63*a* receives operation information from the user interface 16 or receives operation information transmitted from the remote controller 17 and received in the light receiver 18, and controls various components to reflect the contents of operation.

The controller 63 mainly uses a ROM (Read Only Memory) 63*b* which stores a control program executed by the CPU 63*a*, a RAM (Random Access Memory) 63*c* which provides a work area to the CPU 63*a*, and a nonvolatile memory 63*d* in which various setting information and control information and the like are stored.

The controller 63 is connected, via a card interface (I/F) 64, to a card holder 65 in which the first memory card 19 is loaded. This allows the controller 63 to exchange information with the first memory card 19 loaded in the card holder 65 via the card I/F 64.

The controller 63 is connected, via a card I/F 66, to a card holder 67 in which the second memory card 20 is loaded. This allows the controller 63 to exchange information with the second memory card 20 loaded in the card holder 67 via the card I/F 66.

The controller 63 is connected to the first LAN terminal 21 via a communication I/F 68. This allows the controller 63 to exchange information with the LAN correspondence HDD connected to the first LAN terminal 21 via the communication I/F 68. In this case, the controller 63 has a DHCP (Dynamic Host Configuration Protocol) server function and assigns an IP (Internet Protocol) address to the LAN correspondence HDD 25 connected to the first LAN terminal 21.

The controller 63 is connected to the second LAN terminal 22 via a communication I/F 69. This allows the controller 63 to exchange information with the devices (see FIG. 1) connected to the second LAN terminal 22 via the communication I/F 69. In this case, the controller 63 functions to access a contents provider 34 via the network 32 for requirement of acquisition of desired contents, based on the user's operation. In addition, the controller 63 functions to receive contents transmitted from the contents provider 34 and help to display an image on the image display device 14 and reproduce an audio in the speaker 15 or record information on record/reproduction devices such as, for example, the HDDs 25, 27 and 39.

In addition, the controller 63 is connected to the USB terminal 23 via a USB I/F 70. This allows the controller 63 to exchange information with the devices (see FIG. 1) connected to the USB terminal 23 via the USB I/F 70.

In addition, the controller 63 is connected to the IEEE 1394 terminal 24 via an IEEE 1394 I/F 71. This allows the controller 63 to exchange information with the devices (see FIG. 1) connected to the IEEE 1394 terminal 24 via the IEEE 1394 I/F 71.

Here, the image display device 14 includes a liquid crystal display panel 14*a* for forming a display image based on an image signal output from the image processor 60 and a backlight 14*b* for emitting illumination light to the liquid crystal display panel 14*a* for image display. The backlight 14*b* includes, for example, a cold cathode tube such as a fluorescent tube or a discharge lamp.

The controller 63 includes a backlight driver 63*e* for driving the backlight 14*b*. The backlight driver 63*e* can control brightness or chromaticity of the illumination light emitted from the backlight 14*b* by varying a level, number of pulses, pulse width and the like of a driving voltage applied to the backlight 14*b*.

In addition, the controller 63 includes an estimated value calculating module 63*f*. The estimated value calculating module 63*f* calculates and retains a difference between a value generated by accumulatively adding factors corresponding to light-on time whenever the backlight 14*b* is lighted-on and then lighted-off and a value generated by accumulatively adding factors corresponding to light-off time whenever the backlight 14*b* is lighted-off and then lighted-on, as an estimated value, details of which will be described later.

That is, the estimated value calculating module 63*f* includes a light-on time-factor table which associates light-on time of the backlight 14*b* with factors as shown in FIG. 3 and a light-off time-factor table which associates light-off time of the backlight 14*b* with factors as shown in FIG. 4. These tables are set in such a manner that longer light-on time A and light-off time B of the backlight 14*b* give a larger factor.

The estimated value calculating module 63*f* is operated to start measurement of lapse time from a light-on point of time using a timer (not shown) or the like when the backlight 14*b* is changed from a light-off state to a light-on state, stop the time measurement when the backlight is lighted-off, acquire factors corresponding to the measured light-on time A from the light-on time-factor table, and add the acquired factors to a currently retained estimated value.

The estimated value calculating module 63*f* is operated to start measurement of the lapse time from a light-off point of time using the timer when the backlight 14*b* is changed from a light-on state to a light-off state, stop the time measurement when the backlight is lighted-on, acquire factors corresponding to the measured light-off time B from the light-off time-factor table, and subtract the acquired factors from a currently retained estimated value.

In the estimated value calculating module 63*f*, an estimated value "0" is set to be a lower limit and calculated estimated values are all set to be "0" if the calculated estimated values are equal to or less than "0." In addition, in the estimated value calculating module 63*f*, an estimated value "7" is set to be an upper limit and calculated estimated values are all set to be "7" if the calculated estimated values are equal to or more than "7."

Figure 5:
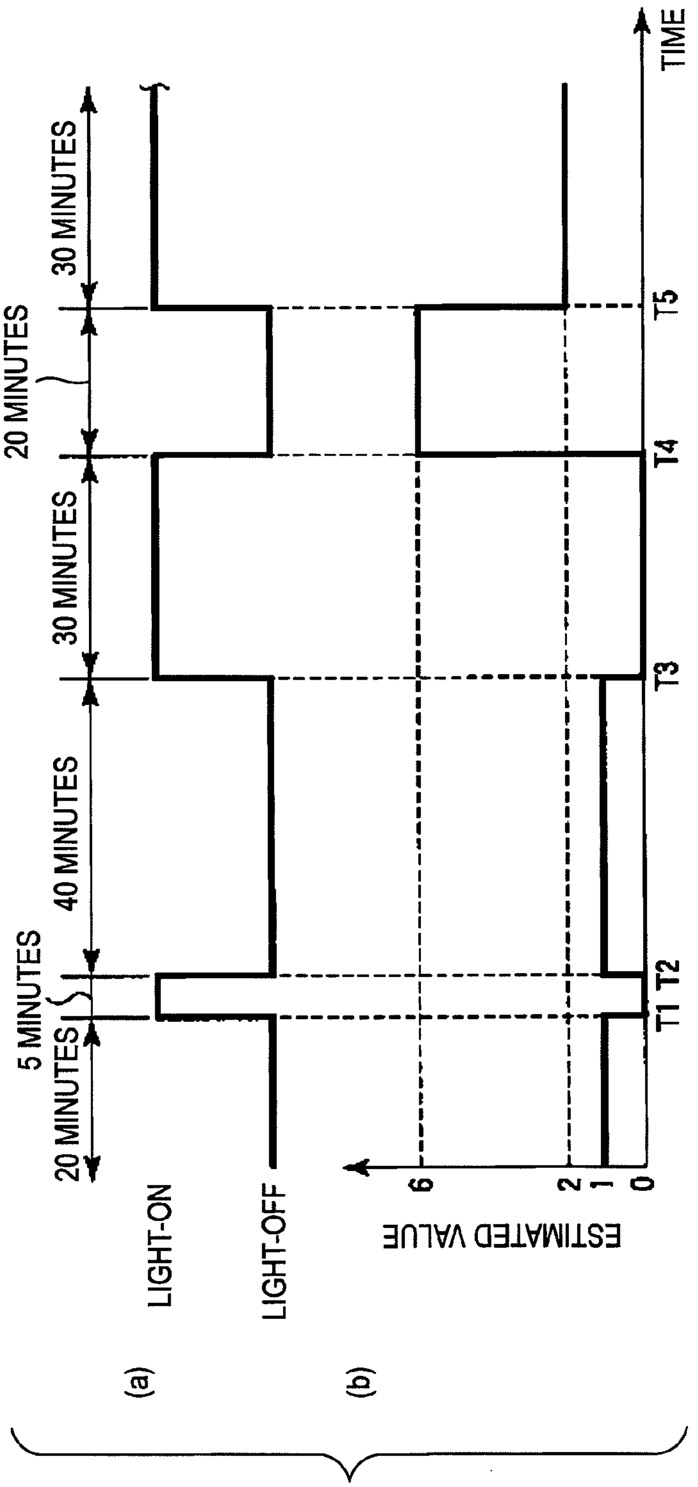
FIG. 5 is a view for explaining an estimated value calculating process performed by the estimated value calculating module of the digital television broadcasting receiver according to this embodiment.

In more detail for the calculation of estimated values, for example, as shown in section (a) of FIG. 5, it is assumed that the backlight 14*b* is lighted-off for 20 minutes, lighted-on for 5 minutes from time T1, lighted-off for 40 minutes from time T2, lighted-on for 30 minutes from time T3, lighted-off for 20 minutes from time T4, and then lighted-on for 30 minutes from time T5.

At this time, as shown in section (b) of FIG. 5, if an estimated value which has been already calculated and retained before time T1 is "1," since the light-off time B was 20 minutes at time T1 when the backlight 14*b* is changed from the light-off state to the light-on state, although a factor "4" is subtracted from the currently retained estimated value "1," the estimated value is set and retained as "0" by the lower limit.

When the backlight 14*b* is changed from the light-on state to the light-off state at time T2, since the light-on time A is 5 minutes, a factor "1" is added to the currently retained estimated value "0" and the estimated value is set and retained as "1." Thereafter, when the backlight 14*b* is changed from the light-off state to the light-on state at time T3, since the light-off time B is 40 minutes, although a factor "7" is subtracted from the currently retained estimated value "1," the estimated value is set and retained as "0" by the lower limit.

Next, when the backlight 14*b* is changed from the light-on state to the light-off state at time T4, since the light-on time A is 30 minutes, a factor "6" is added to the currently retained estimated value "0" and the estimated value is set and retained as "6." Thereafter, when the backlight 14*b* is changed from the light-off state to the light-on state at time T5, since the light-off time B is 20 minutes, a factor "4" is subtracted from the currently retained estimated value "6" and the estimated value is set and retained as "2."

Hereinafter, likewise, the operation that the factor corresponding to the previous light-off time B is subtracted from the currently retained estimated value when the backlight 14*b* is lighted-on and the factor corresponding to the previous light-on time A is added to the currently retained estimated value when the backlight 14*b* is lighted-off is repeated to calculate estimated values.

That is, in a history of repetition of the light-on and light-off of the backlight 14*b*, estimated values calculated in the estimated value calculating module 63*f* become larger as a ratio of the light-on time becomes larger than that of the light-off time and become smaller as a ratio of the light-off time becomes larger than that of the light-on time.

On the one hand, the backlight 14*b* increases in its maintenance temperature as the light-on time, i.e., electrical conduction time, becomes longer, and as the backlight is lighted-on with increased maintenance temperature, a misalignment from a stable state of brightness or chromaticity at a light-on start point of time becomes smaller and time taken until the brightness or chromaticity reaches the stable state becomes shorter.

On the other hand, the backlight 14*b* decreases in its maintenance temperature as the light-off time, i.e., electrical non-conduction time, becomes longer, and as the backlight is lighted-on with decreased maintenance temperature, a misalignment from a stable state of brightness or chromaticity at a light-on start point of time becomes larger and time taken until the brightness or chromaticity reaches the stable state becomes longer.

In particular, as the backlight 14*b* has a longer light-off time and becomes lighted-on with decreased maintenance temperature, it has a tendency for the brightness to increases over the stable state and the chromaticity is greatly varied at the light-on start point of time. On this account, in order to obtain the same brightness and chromaticity as in the stable state from the light-on start point of time even when the backlight 14*b* is lighted-on under conditions of low maintenance temperature or ambient temperature, the brightness or chromaticity of the illumination light is corrected by adjusting electrical conduction to the backlight 14*b*.

Figure 6:
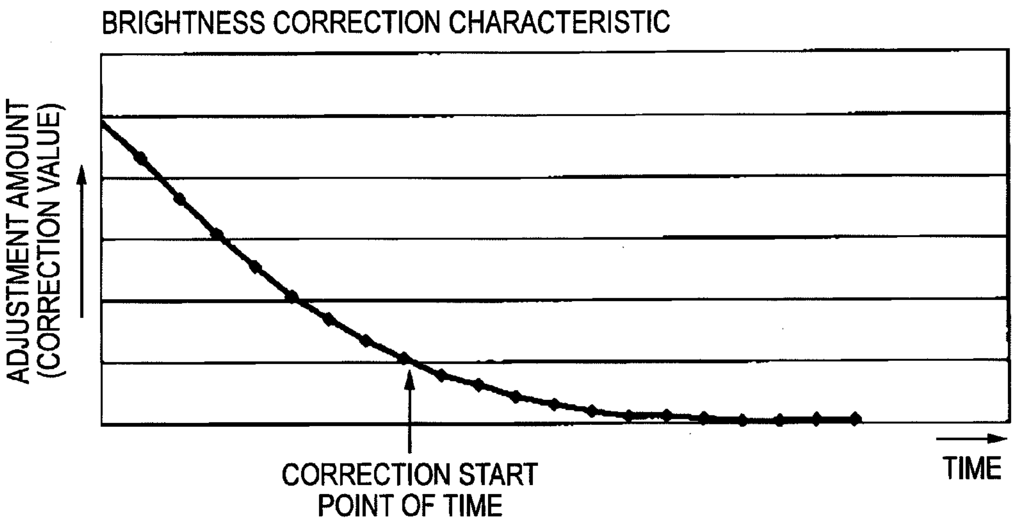
FIG. 6 is a view for explaining a brightness correction characteristic of the digital television broadcasting receiver according to this embodiment.

FIG. 6 shows a brightness correction characteristic for the backlight 14*b*. Referring to FIG. 6, the backlight has a characteristic that the left end represents the largest amount of correction of brightness for light-on of the backlight 14*b*, and after that, the amount of correction is reduced with lapse of electrical conduction time, that is, as the brightness of the illumination light becomes stable with increased maintenance temperature of the backlight 14*b*.

The brightness correction characteristic for the backlight 14*b* is stored in the nonvolatile memory 63*d*. When the backlight 14*b* is required to be lighted-on, the backlight driver 63*e* controls electrical conduction to the backlight 14*b* to follow this brightness correction characteristic in order to correct the brightness of the illumination light.

In this case, when the backlight 14*b* is required to be lighted-on, the controller 63 sets the amount of correction at a correction start point of time on the brightness correction characteristic in the backlight driver 63*e*, that is, the light-on start point of time, based on the estimated values calculated in the estimated value calculating module 63*f*.

In short, as an estimated value becomes larger, that is, as it is determined that a ratio of the light-on time is larger than that of the light-off time and the maintenance temperature of the backlight 14*b* is high, the correction start point of time is shifted to the right side in FIG. 6. That is, excessive brightness correction is to prevent by making the amount of correction of the backlight 14*b* small at the light-on start point of time.

On the contrary, as an estimated value becomes smaller, that is, as it is determined that a ratio of the light-off time is larger than that of the light-on time and the maintenance temperature of the backlight 14*b* is low, the correction start point of time is shifted to the left side in FIG. 6. That is, the same brightness as in a stable state is obtained by making the amount of correction of the backlight 14*b* large at the light-on start point of time.

Figure 7:
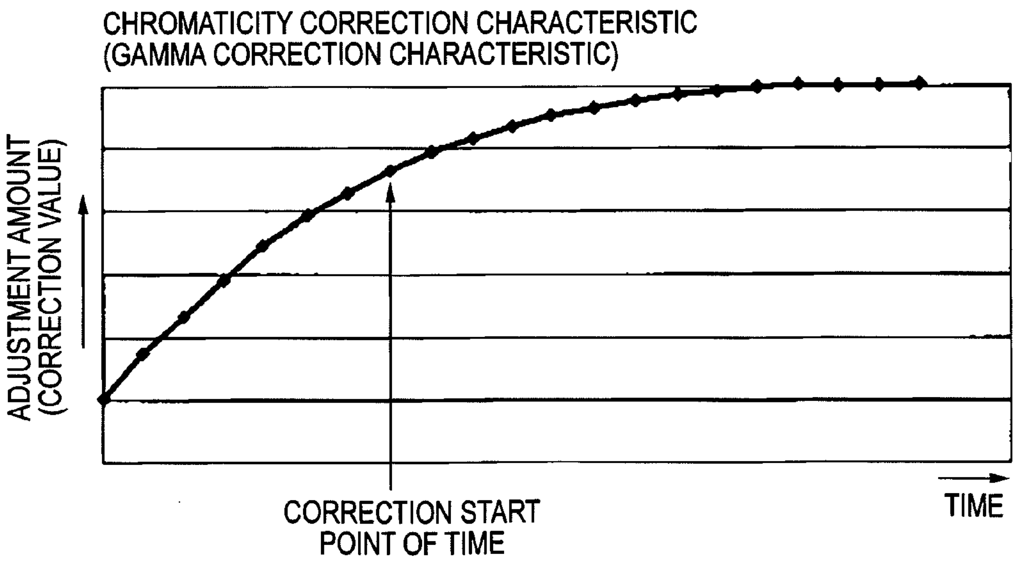
FIG. 7 is a view for explaining a chromaticity correction characteristic of the digital television broadcasting receiver according to this embodiment.

FIG. 7 shows a gamma correction characteristic for chromaticity correction for the backlight 14*b*. Referring to FIG. 7, the backlight has a characteristic that the left end represents the largest amount of correction of chromaticity for light-on of the backlight 14*b*, and after that, the amount of correction is reduced with lapse of electrical conduction time, that is, as the chromaticity of the illumination light becomes stable with increased maintenance temperature of the backlight 14*b*.

The chromaticity correction characteristic for the backlight 14*b* is stored in the nonvolatile memory 63*d*. When the backlight 14*b* is required to be lighted-on, the backlight driver 63*e* controls electrical conduction to the backlight 14*b* to follow this chromaticity correction characteristic in order to correct the chromaticity of the illumination light.

In this case, when the backlight 14*b* is required to be lighted-on, the controller 63 sets the amount of correction at a chromaticity correction start point of time in the backlight driver 63*e*, that is, the light-on start point of time, based on the estimated values calculated in the estimated value calculating module 63*f*.

In short, as an estimated value becomes larger, that is, as it is determined that a ratio of the light-on time is larger than that of the light-off time and the maintenance temperature of the backlight 14*b* is high, the correction start point of time is shifted to the right side in FIG. 7. That is, excessive chromaticity correction is prevent by making the amount of correction of the backlight 14*b* small at the light-on start point of time.

On the contrary, as an estimated value becomes smaller, that is, as it is determined that a ratio of the light-off time is larger than that of the light-on time and the maintenance temperature of the backlight 14*b* is low, the correction start point of time is shifted to the left side in FIG. 7. That is, the same chromaticity as in a stable state is obtained by making the amount of correction of the backlight 14*b* large at the light-on start point of time.

Figure 8:
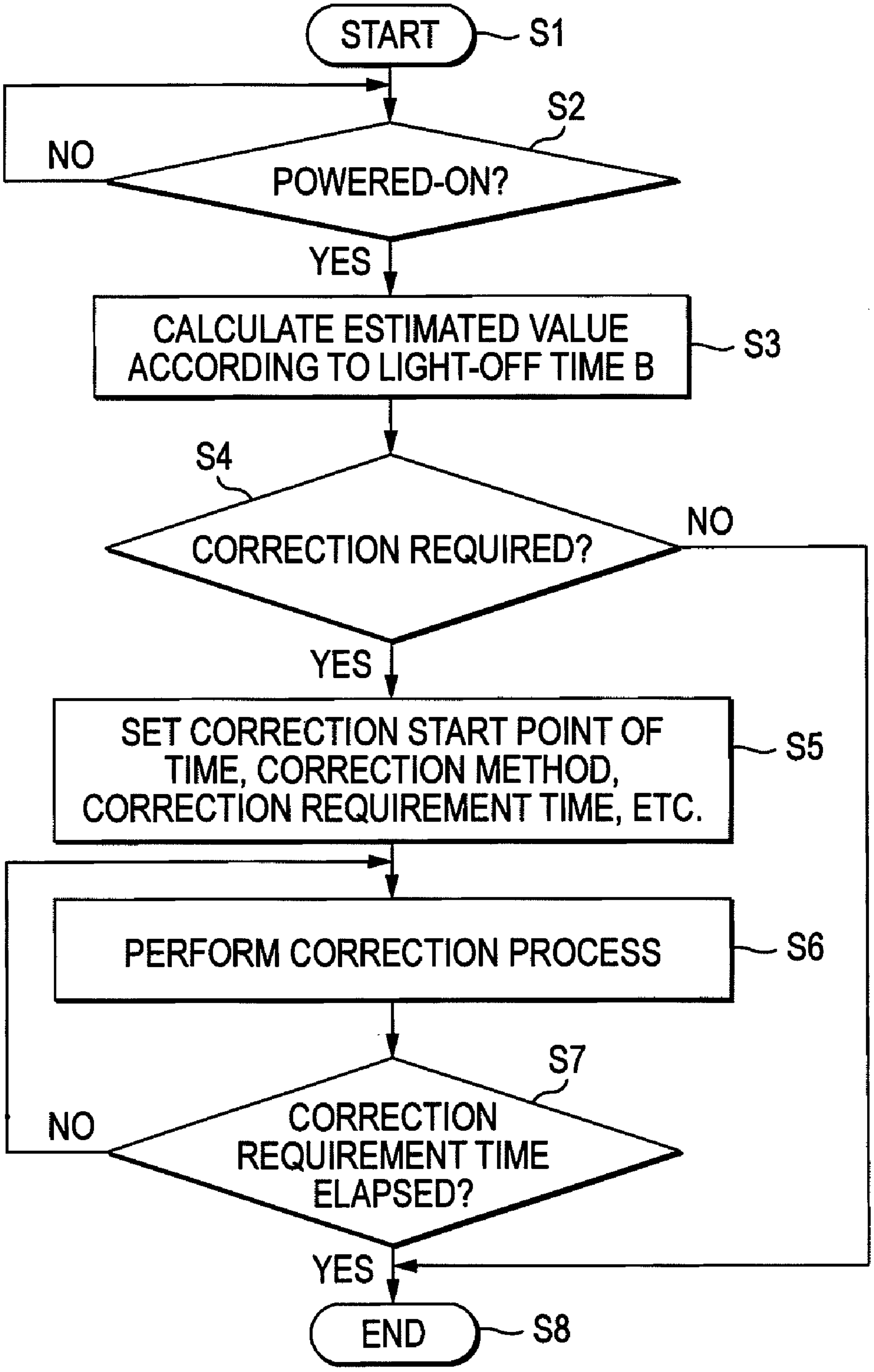
FIG. 8 is a flow chart for explaining main processes at the time of power-on of the digital television broadcasting receiver according to this embodiment.

FIG. 8 is a flow chart showing a process of the controller 63 when the backlight 14*b* is required to be lighted-on. This process starts in a state where the backlight 14*b* is lighted-off (Step S1).

Then, at Step S2, the controller 63 determines whether or not the digital television broadcasting receiver 11 is powered on. If it is determined that the receiver 11 is powered on (YES), that is, when the backlight 14*b* is required to be lighted-on, at Step S3, the estimated value calculating module 63*f* calculates and retains an estimated value by subtracting a factor corresponding to the light-off time B before the backlight 14*b* is lighted-on from the currently retained estimated value.

At Step S4, the controller 63 determines whether or not brightness or chromaticity correction for the backlight 14*b* is required based on the calculated estimated value. If it is determined that the correction is not required (NO), the correction process for the backlight 14*b* is ended (Step S8).

On the contrary, if it is determined at Step S4 that the brightness and/or chromaticity correction for the backlight 14*b* is required (YES), the controller 63 sets a correction start point of time, a correction method, correction requirement time and the like for the brightness or chromaticity to be corrected of the backlight 14*b* at Step S5 and causes the backlight driver 63*e* to perform a correction process along lapse of time from the light-on start point of time at Step S6.

At Step S7, the controller 63 determines whether or not the correction requirement time is elapsed. If it is determined that the correction requirement time is not elapsed (NO), the process returns to Step S6 to cause the backlight driver 63*e* to continue the correction process. If it is determined that the correction requirement time has been elapsed (YES), the correction process for the backlight 14*b* is ended (Step S8).

Figure 9:
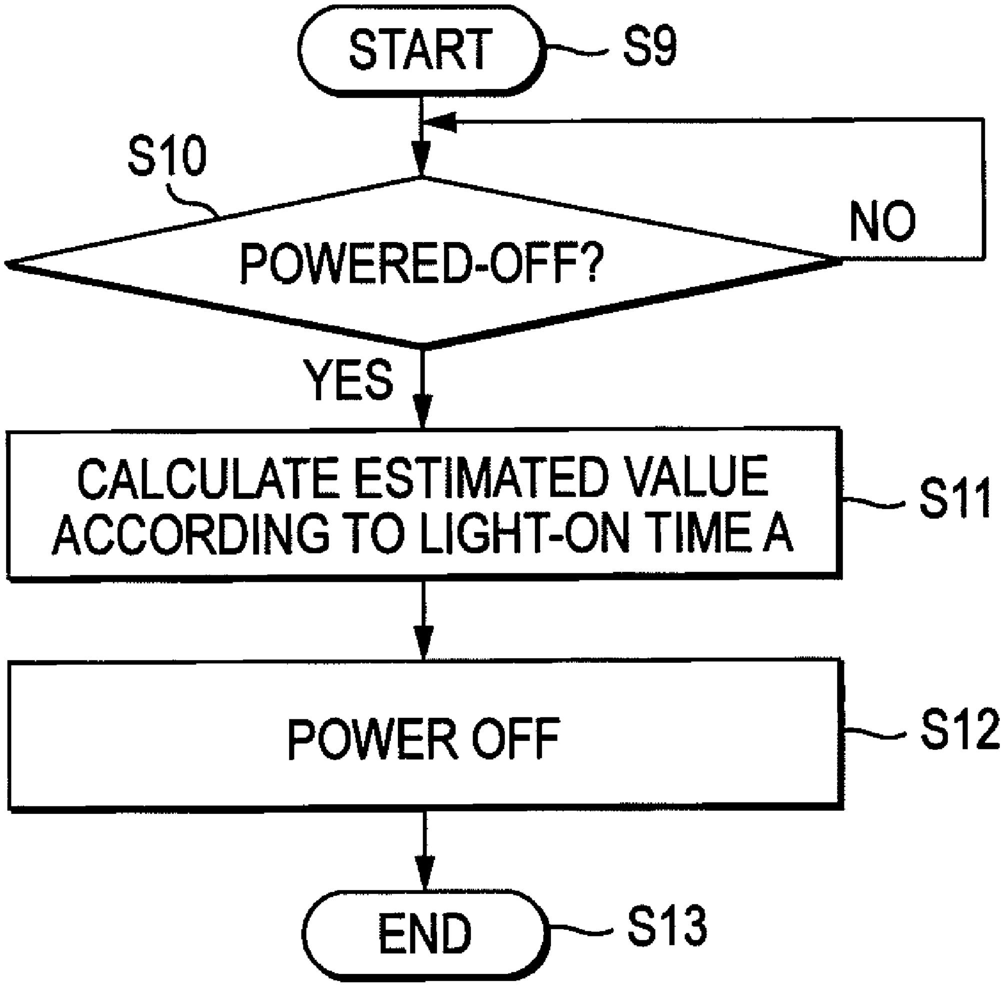
FIG. 9 is a flow chart for explaining main processes at the time of power-off of the digital television broadcasting receiver according to this embodiment.

FIG. 9 is a flow chart showing a process of the controller 63 when the backlight 14*b* is required to be lighted-off. This process starts in a state where the backlight 14*b* is lighted-on (Step S9).

Then, at Step S10, the controller 63 determines whether or not the digital television broadcasting receiver 11 is powered off. If it is determined that the receiver 11 is powered off (YES), that is, when the backlight 14*b* is required to be lighted-off, at Step S11, the estimated value calculating module 63*f* calculates and retains an estimated value by add a factor corresponding to the light-on time A before the backlight 14*b* is required to be lighted-off to the currently retained estimated value.

Thereafter, at Step S12, the controller 63 turns power off according to the previously performed power off operation which lights the backlight 14*b* off, and ends the process (Step S13).

According to the above-described embodiment, when the backlight 14*b* is required to be lighted-on, the amount of correction at the correction start point of time on the brightness or chromaticity correction characteristic, that is, the light-on start point of time, is set based on the ratios of the light-on time A and light-off time B of the backlight 14*b*, which are acquired based on the history of repetition of light-on and light-off of the backlight 14*b* before that point of time when the backlight 14*b* is required to be lighted-on.

This prevents too little or more brightness or chromaticity correction for the backlight 14*b* and prevents variation of image quality by stably emitting illumination light having optimal brightness or chromaticity at any times, which is sufficient to put the backlight in practical use.

The light-on time A and light-off time B of the backlight 14*b* measured in the estimated value calculating module 63*f* is not limited to using the timer, but may be measured using, for example, a count value of a counter which counts a reference clock having a certain period.

In digital broadcasting, time information called TOT (Time Offset Table) can be acquired at all times via, for example, the tuner 51. Accordingly, a light-on point of time and a light-off point of time are acquired from TOT, and the light-on time A can be obtained when a difference therebetween is calculated. In addition, a light-off point of time and a light-on point of time are acquired from TOT, and the light-off time B can be obtained when a difference therebetween is calculated.

In addition, lapse time in power cut-off can be calculated by acquiring a point of time immediately before the power is cut off from TOT and storing the acquired point of time in the nonvolatile memory 63*d* when a plug of the digital television broadcasting receiver 11 is pulled out of an outlet of commercial alternating power source during a light-off period of the backlight 14*b* and acquiring a point of time from TOT when the plug is inserted in the outlet, that is, when the receiver 11 is powered on.

Although factors are set every 5 minutes for the light-on time A and the light-off time B of the backlight 14*b* in the above-described embodiment, without being limited thereto, factors may be appropriately set as occasion demands, for example, every one minute or 10 minutes.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus comprising:

a display panel configured to display an image based on an image signal;

an illumination module configured to illuminate the display panel with light; and a controller configured to correct at least one of brightness and chromaticity of the light output from the illumination module, wherein the controller comprises a light-on time-factor table that associates light-on time of the illumination module with factors and a light-off time-factor table that associates light-off time of the illumination module with factors, wherein the controller is configured to:

calculate a difference as an estimated value, the difference between an accumulatively added value of factors corresponding to the light-on time of the illumination module acquired from the light-on time-factor table and an accumulatively added value of factors corresponding to the light-off time of the illumination module acquired from the light-off time-factor table; and set a correction start point on a correction characteristic preset for correcting at least one of the brightness and the chromaticity of the light output by the illumination module based on the estimated value.

2. The image display apparatus of claim 1, wherein the controller is configured to:

set a correction start point on the correction characteristic at a position increasing a correction amount as the estimated value indicates that the light-on time is longer than the light-off time of the illumination module; and set the correction start point on the correction characteristic at a position decreasing the correction amount as the estimated value indicates that the light-off time is longer than the light-on time of the illumination module.

3. The image display apparatus of claim 1, wherein the display panel comprises a liquid crystal display panel, and wherein the illumination module comprises a backlight configured to be a cold cathode ray tube.

4. An image display method comprising:

illuminating a display panel configured to display an image based on an image signal with light output from an illumination module;

calculating a difference as an estimated value, the difference between an accumulatively added value of factors corresponding to light-on time of the illumination module acquired from a light-on time-factor table that associates light-on time of the illumination module with factors and an accumulatively added value of factors corresponding to light-off time of the illumination module acquired from a light-off time-factor table that associates light-off time of the illumination module with factors; and setting a correction start point on a correction characteristic preset for correcting at least one of brightness and chromaticity of the light output by the illumination module based on the estimated value.

5. The image display apparatus of claim 1, wherein the controller is configured to:

add a factor, which corresponds to the light-on time of the illumination module acquired from the light-on time-factor table, to a current estimated value and retain the added result; and subtract a factor, which corresponds to the light-off time of the illumination module acquired from the light-off time-factor table, from the current estimated value and retain the subtracted result.

6. The image display apparatus of claim 1, wherein the controller is configured to set an upper limit and a lower limit on the estimated value to be calculated.

7. The image display apparatus of claim 1, wherein the controller is configured to:

determine whether or not a correction is necessary on at least one of the brightness and the chromaticity of the light output from the illumination module based on the estimated value that is calculated; and omit performing the correction in a case where the correction is unnecessary.

8. The image display apparatus of claim 1, wherein the controller is configured to measure the light-on time and the light-off time of the illumination module by a counter that counts a reference clock having a predetermined cycle.

9. The image display apparatus of claim 1, wherein the controller is configured to measure the light-on time and the light-off time of the illumination module based on time information acquired by receiving a digital broadcast.

* * * * *